Sept. 12, 1967     J. WAMPFLER     3,341,223
RETRACTIBLE SAFETY STEPS
Filed Sept. 1, 1965     2 Sheets-Sheet 1

INVENTOR
JACOB WAMPFLER

BY
ATTORNEY

Sept. 12, 1967     J. WAMPFLER     3,341,223
RETRACTIBLE SAFETY STEPS
Filed Sept. 1, 1965     2 Sheets-Sheet 2

INVENTOR
JACOB WAMPFLER
Rupert J. Brady
ATTORNEY

United States Patent Office 3,341,223
Patented Sept. 12, 1967

3,341,223
RETRACTIBLE SAFETY STEPS
Jacob Wampfler, Riegelsville, Pa. 18077
Filed Sept. 1, 1965, Ser. No. 484,392
7 Claims. (Cl. 280—166)

ABSTRACT OF THE DISCLOSURE

Retractible safety steps for vehicles, such as school buses or the like, comprising a pair of step members connected beneath the emergency door of a bus, and normally in a retracted position stored beneath the bus with a pivot arm operator substantially in the same plane as the first step of the pair, connected between the emergency door and the first step, whereby upon opening the emergency door, the pivot arm operator simultaneously moves the pair of steps from the retracted position to a position beneath the emergency door to assist passengers in a safe exit therefrom.

---

Although the retractible safety step unit of the present invention is shown and described for use in connection with a school bus type vehicle, this type vehicle is used only for purposes of illustration and it is to be understood that the retractible safety step unit can be used on other type vehicles. Most buses of the type used for conveying school children have an emergency exit door at the rear of the vehicle body to facilitate exit of passengers from the vehicle at one or both ends in case of emergency. In exiting school bus vehicles, when an emergency arises which necessitates the bus to be quickly unloaded of its passengers, the back emergency door is pushed open and the passengers jump from the vehicle to the ground. In most school buses the distance from the interior floor of the bus to the ground is approximately three feet, and while this height is not too great, it is a rather substantial height for small children to jump, particularly when they are leaving the emergency door as quickly as possible and under the stress and strain of the moment. This height is sufficient to result in injury to the passengers or children as they jump to the ground, which can cause a pile-up of passengers on the ground, such as to prevent others from escaping through the emergency door. A jump from this height is especially apt to result in injury, if the passengers consist of older persons or handicapped children.

It is, therefore, the main object of the present invention to provide a construction of retractible safety steps for the emergency doors of common carrier type vehicles such as school buses which are automatically extended when the emergency door is opened.

Another object of the invention is to provide a construction of safety step unit for school buses and the like which are normally retracted beneath the bus and are automatically extended beneath the emergency door to aid passengers in descending to ground level as the emergency door is opened.

Another object of the invention is to provide a novel construction of safety step unit for the emergency door of a bus, having plural steps which are completely retractible when not in use.

Another object of the invention is to provide a retractible safety step unit for bus emergency doors which lessens the hazard of injury to passengers leaving the emergency door and enables the passengers to alight more safely and quickly.

A further object of the invention is to provide a construction of retractible safety step unit for use in conjunction with the emergency door of a bus which locks the emergency door in open position when the steps are extended.

Still a further object of the invention is to provide a retractible safety step unit for school buses which is simple in construction, easy and economical to manufacture and easy to install on existing bus bodies with a minimum of modifications.

Other and further objects of the invention reside in the simple reliable construction of the step unit, the novel connecting linkage between the emergency door and the step unit, the novel structure which covers the aperture in the vehicle in the retracted position of the steps through which the steps extend when the door is opened and the structure whereby the emergency door cannot accidentally close once the safety step unit is extended, as set forth more fully in the specification hereinafter following by reference to the accompanying drawings, in which.

Figure 1:
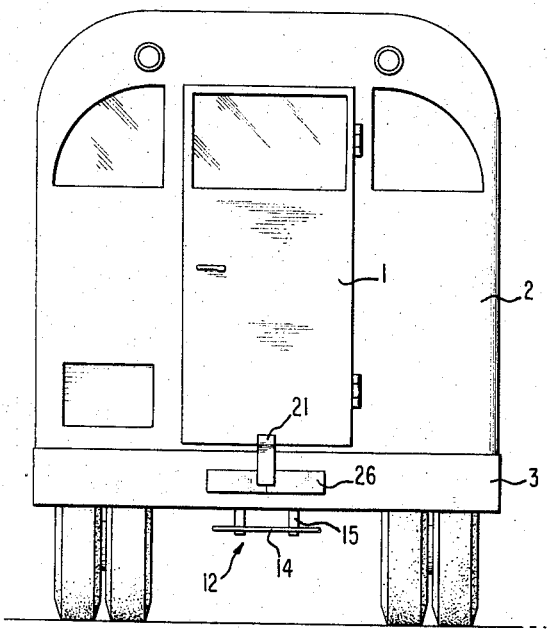
FIGURE 1 is a rear elevational view of a school bus having the retractible safety steps, according to the present invention, in retracted position.

Referring to the drawings in greater detail—reference numeral 1 indicates the emergency door at the rear of the bus body, above rear bumper 3, generally of the wrap-around type which is supported by vehicle body 2 such that the bumper is spaced slightly outwardly therefrom. The bumper construction illustrated is generally that of the more modern type on school buses, but it is to be understood that the present invention is also adaptable to the older type bus constructions.

Figure 4:
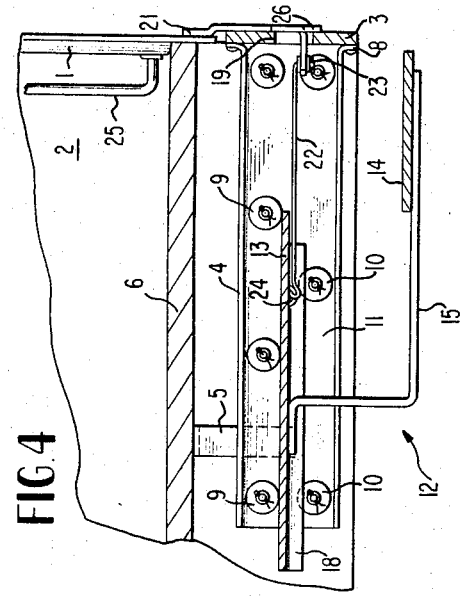
FIG. 4 is a view similar to FIG. 3, but showing the emergency door closed and the steps in retracted position.
Figure 3:
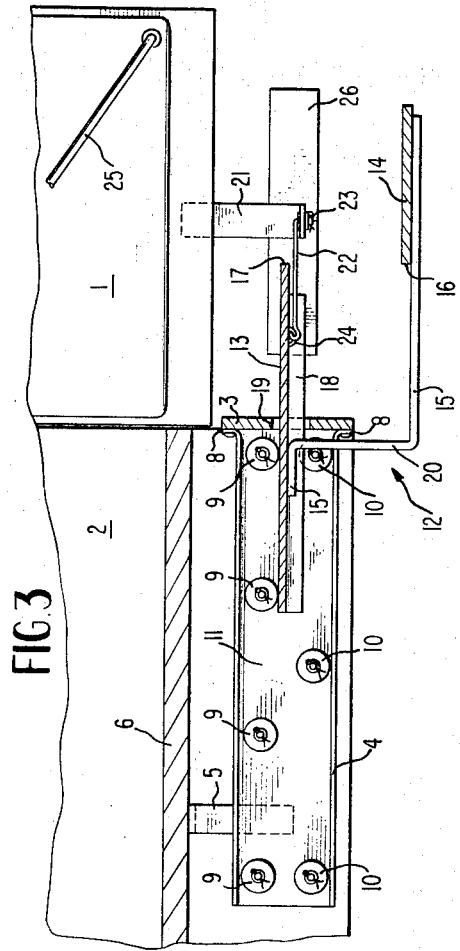
FIG. 3 is an enlarged fragmentary longitudinal sectional view taken substantially along line 3—3 of FIG. 2, and showing the emergency steps in extended position.
Figure 5:
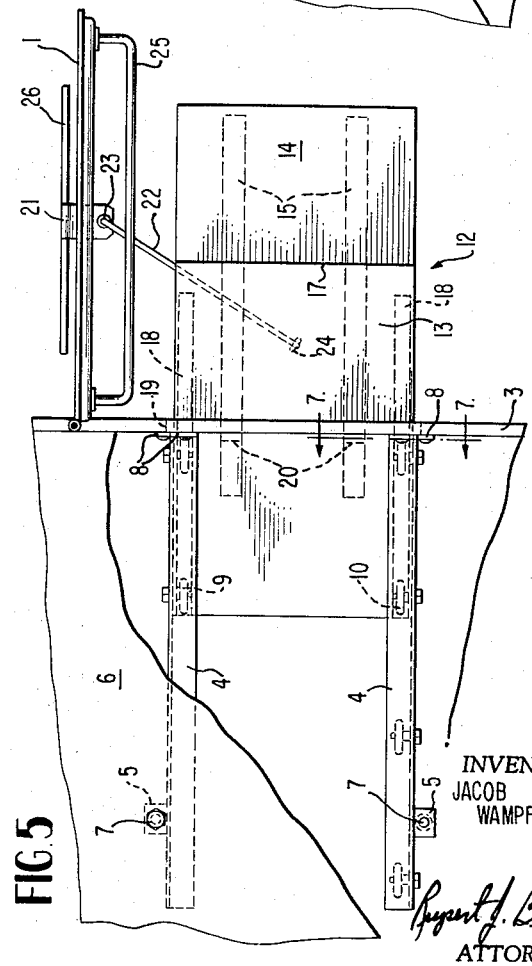
FIG. 5 is a top plan view, partly broken away, of a fragmentary portion of the rear of the bus of FIG. 2, showing the door open and emergency steps extended.

A pair of spaced channel members 4, opening inwardly toward each other, are connected beneath the vehicle body at the rear thereof by means of mounting straps 5, connecting the inner ends of the channel members to the floor or undercarriage 6 of the vehicle body by means of bolts 7 or other suitable connecting means. The outer ends of channel members 4 are flared outwardly as indicated in FIGS. 3, 4 and 5 to form flanges 8 which are secured by means of bolts or the like to the back of bumper 3 to thus rigidly connect the channel members in spaced relation under the body of the vehicle. The channel members 4 are symmetrically disposed beneath the emergency exit of the vehicle and each channel member is provided with an upper row of roller members 9 and a spaced lower row of roller members 10 connected to the inwardly facing surfaces of channel webs 11. The roller members 9 and 10 are connected along the length of the channel members with the end rollers of the upper and lower rows preferably positioned along substantially the same vertical axis and the intermediate rollers 10 of the lower rows staggered between the intermediate rollers 9 of the upper rows, as indicated in FIGS. 3 and 4. The rollers 9 and 10 serve as guides for the retractible step unit indicated generally at 12.

The retractible safety step unit 12 comprises a generally rectangular top step member 13 constructed of substantially heavy gage metal, and a lower step member spaced below and rearwardly of top step member 13 and connected to the lower surface of top step member 13 by a pair of depending supports or angle straps 15 of generally L-shaped construction. Angle straps 15 are constructed of heavy gage metal and are connected to the lower surfaces of both steps 13 and 14 by means of welding, rivets or bolts. The lower step member 14 and top step member 13 are positioned in horizontal planes substantially parallel with each other such that the inner edge 16 of lower step 14 is disposed in substantially vertical alignment with the outer edge 17 of top step member 13. It is to be noted that top step member 13 is substantially longer than it is wide, with the longitudinal axis of its rectangular form disposed in parallel alignment with the longitudinal axis of the vehicle body.

Figure 7:
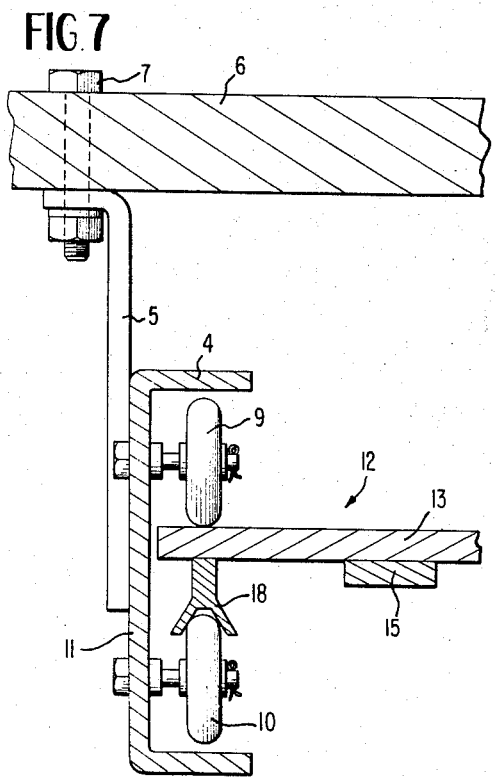
FIG. 7 is an enlarged fragmentary cross-sectional view taken substantially along line 7—7 of FIG. 5.

A pair of downwardly opening guide channels 18 are connected to the lower surface of top stop member 13 and extend longitudinally thereof, spaced slightly inwardly of opposite longitudinal edges. The retractible step unit 12 is connected between the pair of channel members 4 such that roller members 9 are disposed in rolling contact with the upper surface of top step member 13, adjacent the longitudinal edges, and roller members 10 of the lower row are engaged in rolling contact with the downwardly opening pair of guide channels 18, as shown particularly in FIG. 7. Channel members 4 are spaced apart a somewhat greater distance than the width of top step member 13 such that the engagement of roller members 10 in guide channels 18 maintains the retractible step unit 12 centered between the webs 11 of channel members 4 and enables the retractible step unit 12 to be moved longitudinally of channel members 4 between the upper and lower rows of roller members 9 and 10. As will be understood from the operation, further in the specification, the roller members 10 support the weight of the retractible step unit 12, and roller members 9 serve as bearing members to enable the retractible step unit to be cantilevered outwardly behind the bumper 3.

Bumper 3 is provided with a rectangular opening 19 substantially centrally thereof beneath emergency door 1, in registration with the spacing between the rows of rollers 9 and 10, to enable top step member 13 to extend through and beyond bumper 3 as the retractible step unit 12 is moved longitudinally rearwardly relative to the pair of channel members 4, and the vehicle body 2. The height of opening 19 is somewhat greater than the height of guide channels 18 and top step member 13, while the width of opening 19 is somewhat greater than the width of top step member 13 to allow the top step member and its depending guide channels 18 to extend therethrough. Lower step member 14 is disposed at a level beneath bumper 3 and extends rearwardly beneath the bumper with its maximum rearward movement limited by the vertical portion 20 of depending supports 15, moving into contact with the rear of bumper 3.

Figure 6:
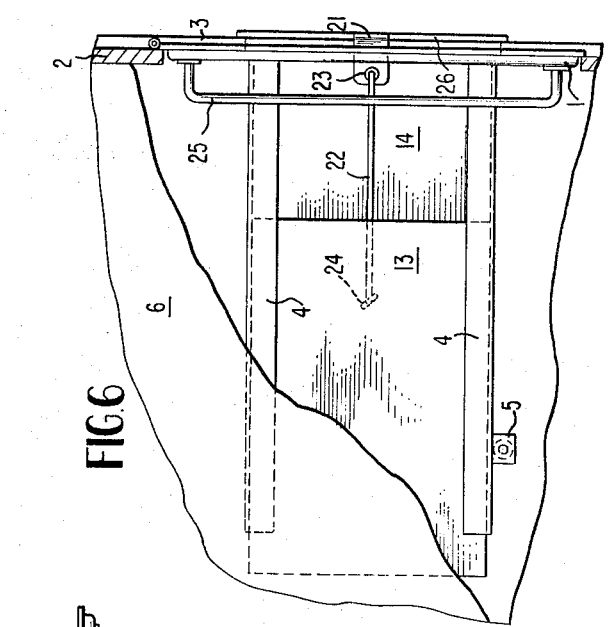
FIG. 6 is a view similar to FIG. 5, showing the emergency door closed and emergency steps retracted.

A vertically depending angle member 21 is connected centrally of emergency door 1 along the exterior lower edge and is contoured to extend downwardly in overlying relation to bumper 3 when the emergency door is in closed position. An inwardly directed lug is provided on the lower end of angle member 21 to which linkage arm 22 is pivotally connected at 23. The opposite end of linkage arm 22 is pivotally connected to the lower surface of top step member 13 at 24, inwardly of outer edge 17, such as by means of a loop formed on the end of arm 22, engaging a link connected to the bottom of step 13 by means of welding or the like. Linkage arm 22 is of such length that in the closed position of the emergency door as shown in FIGS. 1, 4 and 6, the retractible step unit 12 is fully retracted in channel members 4 and is fully retracted behind bumper 3 with the lug on the end of angle member 21 forming pivot connection 23 extending inwardly of rectangular opening 19. In the closed position, pivot connections 23 and 24, and linkage arm 22 are preferably in axial alignment with the longitudinal axis of the retractible step unit.

Figure 2:
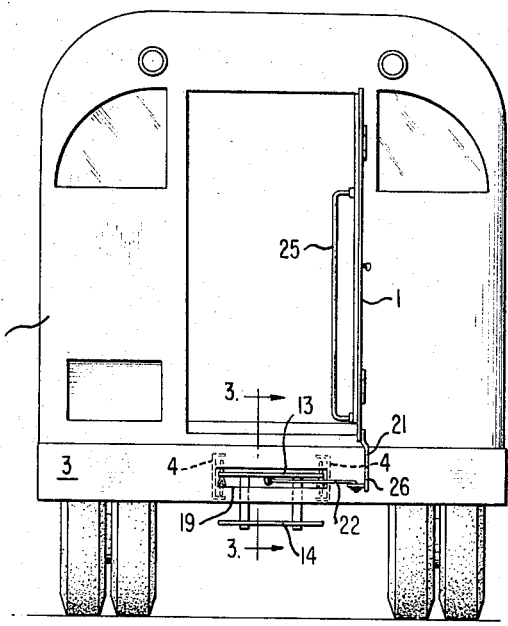
FIG. 2 is a rear elevational view similar to FIG. 1, but showing the rear emergency door open and the steps extended.

To operate the retractible step unit, the rear emergency door 1 is opened and swung outwardly with a push in the usual manner. As door 1 swings outwardly, linkage arm 22 pivotally connected thereto through depending member 21 pulls outwardly on the retractible step unit causing the same to travel rearwardly between rollers 9 and 10. As the step unit travels rearwardly lower step member 14 passes beneath rear bumper 3 and extends beyond the bumper as the rear portion of top step member 13 adjacent outer edge 17 moves through rectangular opening 19 in bumper 3 and extends beyond the bumper beneath the emergency door opening. The rearward travel of the steps is halted by member 20 abutting the bumper, and at this point the emergency door is fully opened, as shown in FIGS. 2, 3 and 5, disposed at approximately right angles to the closed position thereof. As the door opens and pulls out the retractible step unit, as viewed from the top, horizontally disposed linkage arm 22 pivotally moves counterclockwise about pivot connection 24, so that in the fully extended position of the steps, the pivot connections 23 and 24 are no longer both along the same longitudinal axis, but are rather offset with respect to each other, with linkage arm 22 disposed diagonally relative to top step member 13, as indicated in FIG. 5. It is to be noted that the guide channel 18, closest to the emergency door 1 in the open position, terminates short of the outer edge 17 of the top step to provide clearance for linkage arm 22 in the extended position of the step unit since the top step member and the linkage arm connection with the door are confined in a relatively small vertical space, as evidenced by the height of opening 19. Since the pivot points 23 and 24 are offset relative to each other, once the steps are extended beyond the rear bumper, they will hold the emergency door 1 in the open position as shown.

In the extended position, top step member 13 extends rearwardly approximately one foot beneath the door opening, and lower step member 14 extends approximately one foot beyond the outer edge 17 of the top step. The steps thus protrude a sufficient distance beyond the bumper to permit a passenger to safely step out of the doorway and down the top and lower step members 13 and 14 while grasping inclined handrail 25 connected to the inner surface of the emergency door. The handrail assists in preventing passengers from slipping when alighting from the bus in a hurry. In the larger type school buses the usual three foot drop, which a person must make when leaving a bus, is reduced to approximately one and a half feet.

It is to be understood that the emergency step unit may also be used for side emergency doors as well as rear emergency doors, where the space beneath the door opening permits.

In the extended position, the downward weight of the step unit is supported by the rearwardmost roller members 10 and the upward force caused by the weight of the unit and persons using the step is borne by the rearwardmost pair of roller members 9, as indicated in FIG. 3, with roller members 9 enabling the two steps to be cantilevered over the rear of the bus. In the extended position, the rollers 9 and 10 engage the forward portion of top step member 13 which always remains in engagement with the rollers and forwardly of the rear bumper. The top step member is substantially longer than the lower step member and at least as much length of the step member remains forwardly of the bumper as the length which extends as a step rearwardly of the bumper.

A transversely extending plate 26 is connected to the lower end of vertically depending angle member 21, such that when the step unit is retracted and the emergency door closed plate 26 overlies and covers rectangular opening 19 in the rear bumper.

To retract the steps an inward movement must be imparted to the step unit 12 at the same time the emergency door 1 is swung shut, because pressure on the emergency door alone will not cause the steps to retract since linkage 22 is disposed in an off-center position. An inner shove can be given the step unit by the foot of the party closing the emergency door and as the door closes the steps will roll longitudinally forward between the upper and lower rows of rollers 9 and 10 until they reach the forwardmost position as the door becomes fully closed, as shown in FIGS. 4 and 6. In lieu of the roller members 9 the height of channel members 4 could be reduced and a nylon bearing pad can be inserted between the upper surface of step 13 and the upper flanges of the channels so that the step 13 is disposed in sliding engagement with the bearing pad. It is to be understood that the roller members 9 and 10 may be constructed of metal or plastic material, such as nylon or Teflon for quiet operation. In the retracted position the downward weight of the step unit 12 is supported at least by a pair of lower roller members 10. If required, the entire unit may be encased in a rearwardly opening protective pan, not shown.

While the invention has been shown and described in certain preferred embodiments, it is realized that modifications can be made without departing from the inventive concept, and it is to be understood that no limitations upon the invention are intended other than those imposed by the scope of the appended claims.

What I claim as new and desire to secure by Letters Patent of the United States, is as follows:

1. A retractible safety step for the emergency exit door of vehicles comprising a pair of laterally spaced longitudinal support members connected beneath the vehicle emergency door and extending forwardly of the vehicle, bearing means connected on the surfaces of said pair of support members facing each other, a first step portion connected for longitudinal movement between said pair of support members by said bearing means, a second step portion, support means depending from said first step portion connecting said second step portion for longitudinal movement therewith, said second step portion spaced below and rearwardly of said first step portion, and an arm member in substantially the same horizontal plane as said first step portion pivotally connected at one end to the base of said emergency door and pivotally connected at the other end beneath said first step portion and adapted to slide said first and second step portions rearwardly from a stored position beneath the vehicle to an extended position beneath the emergency door as the door is opened.

2. In a bus-type vehicle of the type having a rearwardly opening emergency door and a rear bumper connected beneath the emergency door, a retractible safety step unit comprising, a pair of longitudinally extending, laterally spaced support members connected beneath the vehicle emergency door and extending forwardly of the vehicle, said pair of support members connected at one end to said rear bumper, said rear bumper having an aperture therethrough extending between said pair of spaced support members, bearing members connected on the pair of support members with the bearing members of opposite support members facing toward each other, a first step member supported for longitudinal movement between said pair of support members by said bearing members and adapted to extend through said aperture, a second step member located beneath said first step member, said second step member extending rearwardly of the first step member and connected to said first step member forwardly of the rear edge thereof and of said rear bumper and connected for movement therewith and adapted to extend beneath said rear bumper, and an arm member pivotally connected at one end to the base of said emergency door and pivotally connected at the other end beneath the said first step member, whereby upon opening the emergency door said arm member moves said first step member rearwardly through said aperture beneath said emergency door and moves said second step rearwardly beneath the bumper.

3. In a bus-type vehicle having an outwardly-opening emergency door and a body panel below the door, a retractible safety step unit comprising, a pair of laterally spaced longitudinal support members connected beneath the vehicle adjacent the emergency door, said pair of support members connected at one end to the body panel below the door, said body panel having a transverse opening extending between said pair of spaced support members, bearing means connected on the inwardly facing surfaces of said pair of support members, a first step portion connected for longitudinal movement between said pair of support members by said bearing means, a second step portion located beneath said first step portion, said second step portion extending rearwardly of the first step portion and connected to the first step portion forwardly of the rear edge thereof and of said body panel and connected for movement therewith, and an arm member pivotally connected at one end to the base of the emergency door and pivotally connected at the other end beneath said first step portion for movement in a horizontal plane, and said arm member adapted to slide said first and second step portions outwardly from a stored position beneath the vehicle to an extended position through said aperture and beneath said body panel, respectively, as the emergency door is opened to provide safety steps beneath the door.

4. A retractible safety step unit as set forth in claim 3 in which said first step portion is rectangular in shape with a greater length than width, and said first step portion having a portion extending inwardly of the aperture in contact with said bearing means when said first step portion is in extended position.

5. A retractible safety step unit as set forth in claim 3 including downwardly opening, longitudinally extending guide channels connected beneath said first step portion and engaging said bearing means to maintain said first step portion centered beneath said pair of support members.

6. A retractible safety step unit as set forth in claim 3 including angle means having a vertical portion connecting said second step portion to the lower surface of said first step portion forwardly of the rear edge thereof, and the vertical portion adapted to abut the body panel to limit the outward movement of said safety step unit.

7. A retractible safety step unit as set forth in claim 3, including a depending member connected to the base of said emergency door substantially centrally thereof, said arm member pivotally connected to said depending member, said depending member terminating substantially at the level of said aperture, and a transversely extending cover plate connected to the terminating end of said depending member and adapted to register and overlie said aperture in said body panel when the emergency door is in closed position.

References Cited

UNITED STATES PATENTS 3,008,533  11/1961  Haberle _____ 182—88
3,229,993  1/1966  Riddle _____ 280—166

LEO FRIAGLIA, *Primary Examiner.*

MILTON BUCHLER, *Examiner.*

L. D. MORRIS, *Assistant Examiner.*